United States Patent Office 2,722,172
Patented Nov. 1, 1955

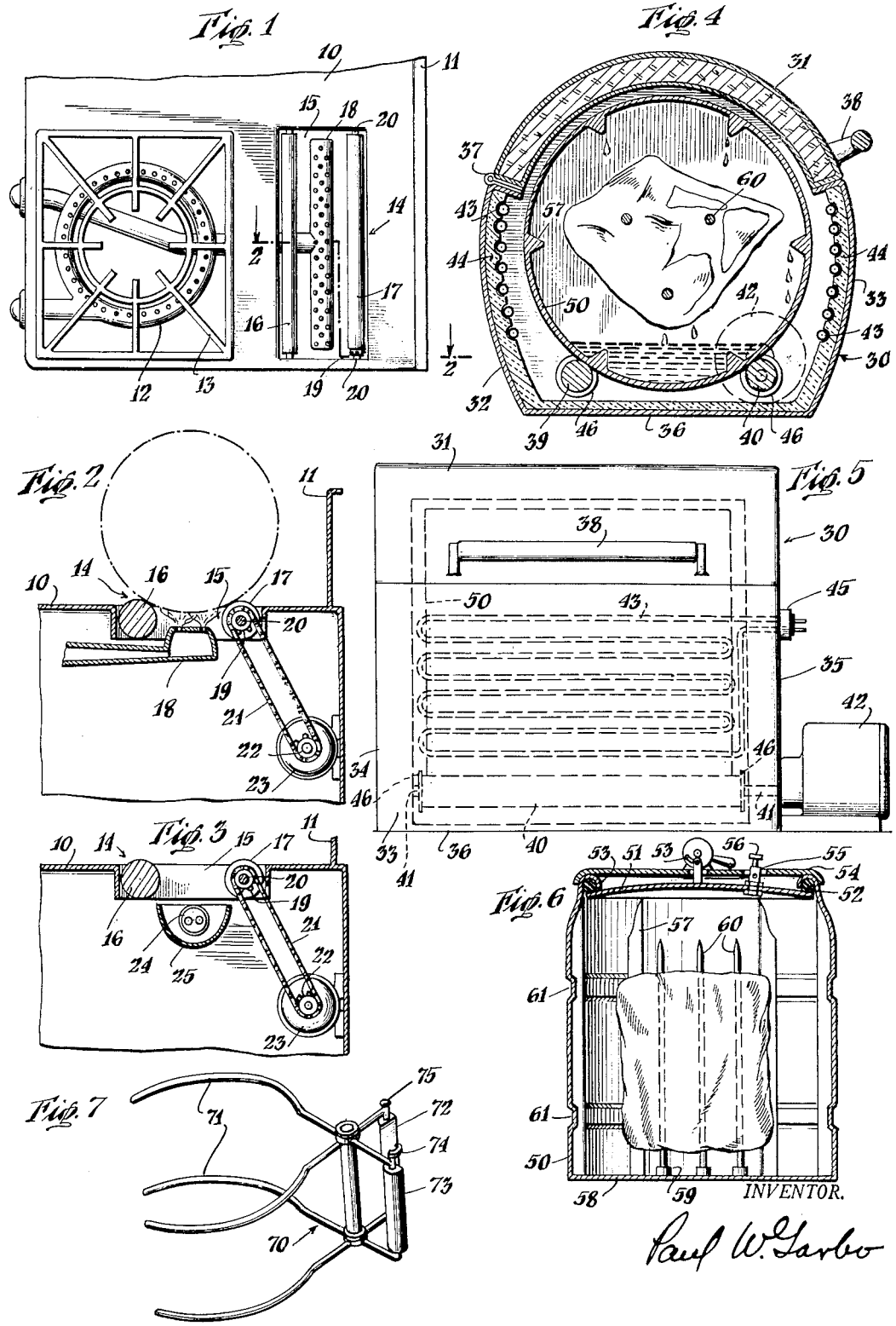

2,722,172

ROTARY COOKER

Paul W. Garbo, Freeport, N. Y.

Application September 24, 1949, Serial No. 117,599

7 Claims. (Cl. 99—421)

This invention relates to cooking apparatus, and more particularly, to apparatus in which food is cooked in a cylindrical vessel or pot which is rotated about its axis while in a horizontal position.

For several decades many proposals have been advanced in an effort to improve cooking ranges and like devices but fundamentally the cooking appliances of today resemble closely those available at the start of the century. The greatest advances in design have been made principally along styling lines. For about fifty years, ranges have had essentially the same oven, broiler and top burners for performing all of the various cooking operations. In the oven and broiler sections of the range, it is still necessary to baste and turn the food over manually; furthermore, even cooking of the food is difficult to attain. The top burners of the range continue to operate inefficiently inasmuch as only the bottom of the cooking pot is exposed to the heating element while the major portion of the pot walls tends to lose heat to the surrounding atmosphere. Moreover, frequent stirring is required in many cases if scorching or burning of the food in the pot is to be avoided. Not only do these manual operations require constant vigilance and consume valuable cooking time but also they are hazardous since painful and costly accidents may result therefrom.

A primary object of this invention is to eliminate manual operations like stirring and basting in the cooking of food.

Another principal object is to effect uniform heating and cooking of food.

Another important object is to achieve new results like grinding and mashing in the course of the cooking operation.

Still another object is to increase the efficiency of cooking appliances.

These and other objects and advantages of the invention will be apparent from the description which follows.

In accordance with this invention, food is cooked in a substantially cylindrical pot which is heated externally and rotated about its axis while in a horizontal position.

For a clearer understanding of the invention, reference is now made to the appended drawing wherein:

Figure 1 is a partial view of the top of a kitchen gas range embodying one modification of this invention;

Figure 2 is a partial sectional elevation of the range of Figure 1 taken along the line 2—2;

Figure 3 is similar to Figure 2 but is a view of a range employing an electric radiant heater instead of a gas burner;

Figure 4 is a sectional elevation of a separate electric appliance embodying another modification of this invention, the section being taken normal to the axis of rotation of the cooking pot;

Figure 5 is a right side view of the appliance of Figure 4;

Figure 6 is a sectional elevation of a cooking pot which may be used in the appliance of Figures 4 and 5 or on the ranges of Figures 1, 2 and 3; and Figure 7 shows a pair of tongs for handling the cooking pot of Figure 6.

Referring to Figures 1 and 2, the range top 10 has a back board 11 and is provided with a conventional top burner 12 and pot holder grid 13. The rotary cooker 14 of this invention is located between top burner 12 and back board 11 and comprises a rectangular opening 15 in the range top 10, an idler roller 16, a driving roller 17 and heating means in the form of an elongated gas burner 18. Driving roller 17 is provided with a sprocket 19 on one of its terminal spindles 20. A chain 21 engages sprocket 19 and another sprocket 22 mounted on the shaft of electric motor 23. Thus, the rotary motion of electric motor 23 is transmitted to driving roller 17 which serves to rotate a cylindrical pot when it is laid with its cylindrical exterior surface in contact with rollers 16 and 17 as indicated in Figure 2 by the phantom circle.

Figure 3, as already stated, is similar to Figure 2 except that the gas burner 18 of the latter view is replaced in Figure 3 by an electric radiant element 24 as the heating means. A parabolic reflector 25 is positioned below heating element 24 to direct the thermal energy up through the opening between rollers 16 and 17 toward the cylindrical cooking vessel which is to be rotated by the rollers.

Figures 4 and 5 show an appliance having a casing 30 with arched top 31, side walls 32 and 33, end walls 34 and 35, and bottom 36. Arched top 31 is a lid which can be opened since it is attached by hinge 37 to the side wall 32. Lid 31 is provided with a handle 38 to facilitate opening. An idler roller 39 and a driving roller 40 are disposed in spaced, parallel relation close to the bottom 36 and are journaled in the end walls 34 and 35. One of the terminal spindles 41 of the driving roller 40 extends through end wall 35 and is coupled to an electric motor 42 which imparts rotation to the driving roller 40. Electric heating coils 43 are set in insulating blocks 44 placed along the side walls 32 and 33 and terminate in plug 45 to which electric power can be brought by an extension wire. Heating coils 43 supply heat to the cylindrical cooking pot 50 which is set with its cylindrical exterior surface resting on rollers 39 and 40. When electricity is furnished to motor 42, driving roller 40 is rotated and, by the contact of the cylindrical exterior surface of pot 50 with roller 40, pot 50 is also rotated while it receives thermal energy from heating coils 43. Rollers 39 and 40 have flanged ends 46 to prevent the drifting of pot 50 along their length while pot 50 is being rotated.

In Figure 6, one form of cylindrical cooking pot 50 is shown with a sealable lid 51 forming a tight seal by being brought up against the rubber or like gasket 52 in the rolled edge 53 of pot 50. Lid 51 is held against gasket 52 by a locking mechanism 53 which cooperates with a bridge bar 54 resting on the rolled edge 53 of pot 50. A combination pressure relief valve and vent 55 attached to lid 51 serves the dual function of releasing excess pressure developed in pot 50 during the heating period and of breaking the vacuum developed when pot 50 cools down. A pressure gauge may also be attached to lid 51. The lid, the gasket, the locking mechanism, the relief valve and vent may take any of the many forms which are used in pressure cookers. If desired, the rotary cooker of this invention may be operated without subjecting the food to pressure; for instance, the thumb-screw 56 of vent 55 may be set so that the contents of pot 50 are at all times vented to the atmosphere.

Cooking pot 50 is provided with internal ribs 57 which help in stirring liquids, basting meats (as shown in Figure 4), and mixing and tumbling chopped foods. The bottom 58 of pot 50 has threaded sockets 59 to hold removable spits 60 on which a piece of meat or a fowl may be supported for cooking. Pot 50 has circumferential grooves 61 into which the gripping elements 71 of the tongs 70 of Figure 7 may be fitted so that pot 50 will not slip out when the tongs 70 are used to pick up pot 50. When the tongs 70 are closed around pot 50, the split handles 72 and 73 come together and may be locked together by swinging the safety latch 74 on handle 73 into engagement with bolt 75 on handle 72. Thus locked, the tongs 70 will securely and safely hold pot 50 while it is being placed on the rollers of the rotary cooker of this invention or being removed therefrom.

In Figure 4, pot 50 is shown as being used in cooking meat which is continuously basted by the sauce or gravy carried up by ribs 57 and dripped therefrom onto the meat which is speared on the spits 60. It is clear that heat is supplied evenly to all sides of the meat so that its cooking proceeds uniformly and rapidly, there is no need for manually stirring the sauce, and basting is continuously and automatically achieved.

When cooking some foods, the spits 60 are not needed and may be removed. Also, if desired, pot 50 may be made without the internal ribs 57. In preparing purees or creamed foods, steel balls, say six or eight, of about one-inch diameter may be placed in pot 50 with the food. During rotation and cooking, the food is continuously tumbled and mashed by the impacts of the rolling balls.

The electric motor which drives the rotary cooker may be provided with a simple "on-off" switch to deliver a predetermined rotational speed, say 25 revolutions per minute, to the cylindrical cooking pot. However, it is desirable to have a variable speed control since, for example, the optimum rotational speeds for basting a piece of meat and creaming some spinach are different.

Cooking dilettantes as well as professional chefs will be quick to visualize not only the simplification and improvement effected by this invention in cooking the usual menus but also the preparation of new culinary delights not attainable heretofore with ordinary cooking appliances.

There are many possible modifications and variations of the rotary cooker of this invention. For instance, in Figure 5, the end wall 34 may be omitted or may be provided with a heat-resistant glass window so that a pressure gauge and/or a thermometer mounted on the lid of the rotating cooking pot can be observed while the food is being cooked. Also, the idler roller 16 of Figure 1 may be replaced by a pair of aligned casters. It is, therefore, intended that all matter contained in the foregoing description shall be interpreted as illustrative and not in a limiting sense.

What I claim is:

1. Cooking apparatus comprising in combination a cylindrical cooking pot with one closed end and an opposite open end, a pressure-sealable lid fitting entirely within the cylindrical periphery of said cylindrical pot and adapted to close said open end, spits disposed within said cylindrical pot and extending susbtantially parallel to the axis thereof, a pair of rollers positioned to support said cylindrical pot with its axis disposed substantially horizontally when said cylindrical pot is placed with its exterior cylindrical surface in contact with said rollers, said rollers having a length greater than the length of said cylindrical pot, driving means adapted to rotate at least one of said rollers, and heating means positioned outside of said cylindrical pot and adapted to direct heat to the exterior cylindrical surface of said cylindrical pot.

2. The cooking apparatus of claim 1 wherein the spits are removably fastened to the closed end of the cylindrical cooking pot.

3. Cooking apparatus comprising in combination a cylindrical cooking pot with one closed end and an opposite open end, a pressure-sealable lid fitting entirely within the cylindrical periphery of said cylindrical pot and adapted to close said open end, holding means disposed within said cylindrical pot to support a cut of meat in spaced relation to the walls of said cylindrical pot, a pair of rollers positioned to support said cylindrical pot with its axis disposed substantially horizontally when said cylindrical pot is placed with its exterior cylindrical surface in contact with said rollers, said rollers extending the full length of said cylindrical pot, driving means adapted to rotate at least one of said rollers, and heating means positioned outside of said cylindrical pot and adapted to heat the contents of said cylindrical pot.

4. The cooking apparatus of claim 3 wherein the driving means comprises an electric motor and the heating means is an electric radiant heater.

5. The cooking apparatus of claim 3 wherein the cylindrical cooking pot is provided with internal ribs substantially parallel to its axis.

6. The cooking apparatus of claim 3 wherein the pair of rollers are disposed near the bottom of an insulated casing adapted to hold the cylindrical cooking pot and having a door to permit the ingress and egress of said cylindrical pot, the driving means comprises an electric motor, and the heating means comprises electric heating elements disposed within said insulated casing.

7. The cooking apparatus of claim 6 wherein the cylindrical cooking pot is provided with internal ribs substantially parallel to its axis.

References Cited in the file of this patent

UNITED STATES PATENTS

| Number | Name | Date |
|---|---|---|
| 66,911 | Teller | July 16, 1867 |
| 134,143 | Jacobus | Dec. 24, 1872 |
| 427,671 | Carpenter | May 13, 1890 |
| 559,720 | Lacroix | May 5, 1896 |
| 1,331,739 | Becker | Feb. 24, 1920 |
| 1,445,488 | Clark | Feb. 13, 1923 |
| 1,702,854 | Simonds | Feb. 19, 1929 |
| 1,762,035 | Soylian | June 3, 1930 |
| 1,836,827 | Thau | Dec. 15, 1931 |
| 1,870,476 | Babcock | Aug. 9, 1932 |
| 1,955,289 | Greenfield | Apr. 17, 1934 |
| 2,004,775 | Wright | June 11, 1935 |
| 2,374,302 | Orkfritz | Apr. 24, 1945 |
| 2,454,392 | Jorgenson | Nov. 23, 1948 |
| 2,543,297 | Olmsted | Feb. 27, 1951 |
| 2,577,184 | Dietrich et al. | Dec. 4, 1951 |

FOREIGN PATENTS

| Number | Country | Date |
|---|---|---|
| 247,701 | Switzerland | Dec. 16, 1947 |